US006526693B2

(12) United States Patent
Cochran

(10) Patent No.: US 6,526,693 B2
(45) Date of Patent: *Mar. 4, 2003

(54) RENEWABLE IN GROUND PLANTING APPARATUS AND METHODS OF MAKING AND USING SAME

(75) Inventor: Bradley Cochran, Royal Oak, MI (US)

(73) Assignee: Insta-Bed Floral Systems, Inc., Royal Oak, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/894,742

(22) Filed: Jun. 28, 2001

(65) Prior Publication Data

US 2002/0005012 A1 Jan. 17, 2002

Related U.S. Application Data

(63) Continuation of application No. 08/927,849, filed on Sep. 11, 1997, now abandoned.
(60) Provisional application No. 60/028,862, filed on Oct. 16, 1996.

(51) Int. Cl.[7] .............................. A01G 9/02; A01G 5/04
(52) U.S. Cl. ................. 47/66.5; 47/75; 47/86; 47/41.14; 47/33
(58) Field of Search ................. 47/41.1, 66.5, 47/75, 86, 87, 39, 41.14, 33; 220/4.23, 4.24, 23.8, 508, 507; 119/61

(56) References Cited

U.S. PATENT DOCUMENTS

| | | | |
|---|---|---|---|
| 180,277 A | * 7/1876 | Schmitt | 220/23.87 |
| D24,337 S | 5/1895 | Gilchrist | |
| 730,082 A | 6/1903 | Bates | |
| 1,899,400 A | * 2/1933 | Shaw | 47/41.1 |
| 1,981,640 A | 1/1934 | Baker et al. | |
| 2,029,314 A | 2/1936 | Ellis | |
| 2,552,051 A | 5/1951 | Margulies | |
| 2,857,862 A | 10/1958 | Dwyer | |
| 2,898,705 A | * 8/1959 | Carlson | 206/804 |
| 3,001,326 A | * 9/1961 | O'Brien et al. | 47/41.1 |
| 3,016,594 A | * 1/1962 | Jacomaro | 249/146 |
| 3,142,133 A | * 7/1964 | Brooks | 206/423 |
| 3,302,324 A | 2/1967 | McDonald et al. | |
| 3,302,326 A | * 2/1967 | Maino | 47/41.1 |
| 3,309,814 A | * 3/1967 | Langley | 47/41.1 |
| 3,484,035 A | * 12/1969 | Swett et al. | 206/521.1 |
| 3,552,634 A | * 1/1971 | Ollier et al. | 215/232 |
| 3,734,279 A | 5/1973 | Fisher et al. | |
| 4,018,338 A | 4/1977 | Lemkin | |
| D244,580 S | 6/1977 | Keough | |
| 4,213,274 A | 7/1980 | Skaife | |
| 4,294,924 A | 10/1981 | Pepicelli et al. | |
| 4,306,376 A | 12/1981 | Strassaker et al. | |
| 4,510,712 A | 4/1985 | Whitcomb | |
| 4,594,646 A | 6/1986 | Kohorn et al. | |
| 4,631,859 A | 12/1986 | Letter et al. | |
| 4,697,703 A | * 10/1987 | Will | 206/363 |
| 4,988,302 A | * 1/1991 | Smith et al. | 435/288.3 |
| 5,022,183 A | 6/1991 | Bohimann | |
| 5,094,060 A | * 3/1992 | Caird | 206/423 |
| 5,103,587 A | 4/1992 | Holler | |
| 5,165,947 A | * 11/1992 | Colucci et al. | 206/204 |
| 5,199,213 A | 4/1993 | Krebs et al. | |
| 5,203,109 A | 4/1993 | Simon et al. | |
| 5,438,796 A | * 8/1995 | Nathan | 47/66.6 |
| 5,695,057 A | 12/1997 | Sullivan | |
| 5,782,374 A | * 7/1998 | Walker | 119/61 |
| D409,909 S | 5/1999 | Hayes et al. | |
| 5,927,009 A | 7/1999 | Vanwingerden | |
| 5,953,859 A | 9/1999 | Cochran et al. | |

* cited by examiner

*Primary Examiner*—Yvonne Abbott
(74) *Attorney, Agent, or Firm*—Law Offices of John Chupa and Associates, P. C.

(57) ABSTRACT

An in-ground rechargeable planter assembly comprising a receptacle body having two or more recesses formed therein and further having a broad peripheral flange which lies at ground level when properly installed. Insert bodies which are precharged with soil and living plants are dropped into cavities in the receptacle body. The adjoining side walls of the cavities are fused together in a thermoforming operation to prevent flexing and hinging of the structure when under load.

3 Claims, 5 Drawing Sheets

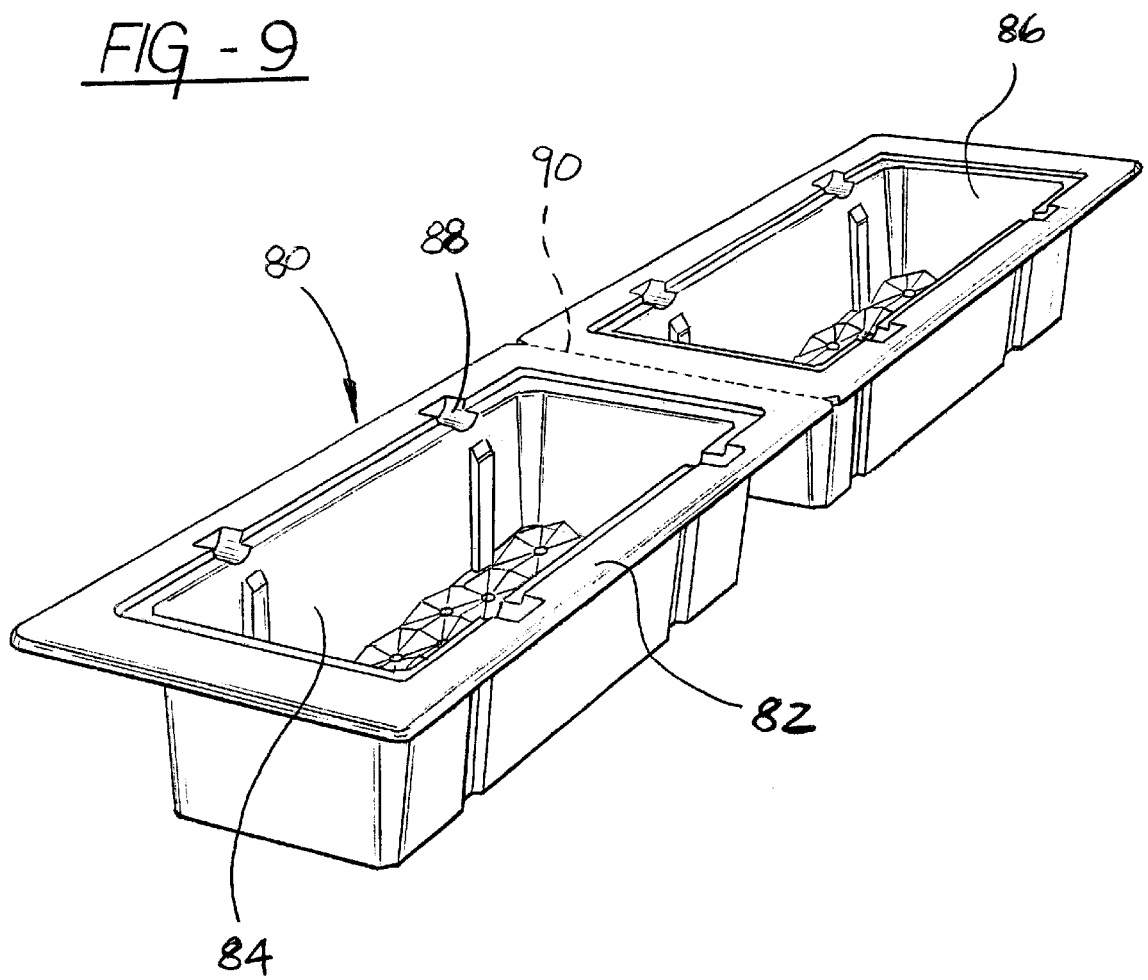

US 6,526,693 B2

RENEWABLE IN GROUND PLANTING APPARATUS AND METHODS OF MAKING AND USING SAME

This Application is a continuation of application Ser. No. 08/927,849, filed Sep. 11, 1997, now abandoned, which claims the benefit of related to the U.S. provisional application Ser. No. 60/028,862, filed Oct. 16, 1996, the disclosure of which is incorporated herein by reference.

FIELD OF THE INVENTION

This invention relates to method and apparatus for proving renewable in-ground planting arrangements in a defined ground area such as a garden or cemetery plot. The apparatus aspect of the invention comprises a rigid receptacle body and one or more typically interchangeable insert bodies which can pre-charged with soil and plant life and placed into the receptacle as hereinafter described. The receptacle body is designed to have a broad, essential planer peripheral flange surrounding a cavity or a set of cavities which extend into the earth when the body is installed. The insert bodies also have top peripheral flanges and are dimensioned and shaped to fit into the receptacle cavities. The method of use involves charging the inserts with soil and living plants and exchanging new charged inserts for old inserts with dead or out-of-season plant life. The manufacturing method can involve either thermoforming or injection molding the bodies.

BACKGROUND OF THE INVENTION

Flowers and plantings are used to beatify many areas of landscape architecture including gardens, homes, burial sites and memorials. Living plants can be provided by placing pots or other containers on the ground; cut flowers can be provided in plastic vases which, according to the prior art, can be placed into receptacles which are semi-permanently installed in the ground. The latter lacks the beauty and permanence of living flowers and the former lacks the aesthetic appeal of in-ground plantings.

While in-ground plantings are preferred for aesthetic purposes, they are, of course, subject to certain drawbacks including theft, vandalism, and difficulty in both installation and maintenance. Of primary concern is the matter of maintaining a peripheral border between the planted area and the surrounding grass so that mowers can be used on the grass without disturbing or destroying the plantings.

SUMMARY OF THE INVENTION

It is a primary objective of our present invention to provide an apparatus which facilitates the creation of in-ground plantings of living flowers, flora and plant life while at the same time simplifying the tasks of installation and maintenance. In general this is achieved by providing a relatively deep receptacle body of rigid non-corrosive material which can be installed in the ground with a broad peripheral flange at ground level and one or more cavities formed within the flange and extending into the earth to a depth of about five inches or more.

Our objective is further achieved by providing a plurality of insert bodies having top peripheral flanges and which are shaped and dimensioned to fit into the cavities with the peripheral flanges thereof partially overlaying the peripheral flange of the receptacle body. In accordance with our invention these inserts are charged with soil and plantings such that may be simply installed in the receptacle cavities and renewed or replaced from time to time with additional pre-charged inserts on a periodic or seasonal basis.

In accordance with our invention the receptacle body and inserts are provided with one or more features which especially adapt them to their intended use. First, the receptacle body, when it is formed with two or more insert-receiving cavities, is rigidified so as to be tolerant of rough treatment and the loading which may be caused by being overrun with the wheels of lawn maintenance equipment. In general this is achieved by a tying together the adjacent sidewalls of the multiple cavities in one of various ways. In the most specific form hereinafter defined the tying of adjacent cavity sidewalls is achieved in a thermoforming operation by locally fusing sidewall areas to one another when the plastic material from which the receptacle bodies are formed are hot and semi-fluid in nature. The elements of the apparatus can, however, be injection molded in which case alternative methods of sidewall joining can be employed.

Another feature involves the formation of a pattern of raised areas in the floor of the receptacle cavities and the dimensioned of the bodies such that the floor of an insert sits on or just above the raised pattern when the flange of the insert seats on the receptacle flange. This helps to prevent the inserts and receptacles from freezing together and also helps to maintain plant roots above any standing water. The inserts and receptacles are preferably provided with drain holes.

Another feature is the provision of a recessed land in the receptacle flange so that the insert flange seats within it. This avoids a high profile which could be damaged by lawn mower blades when the inserts are in place.

Another feature is the provisions of multiple recess in the receptacle flange in adjacent and underlying relationship to the insert flanges when the inserts are installed. This greatly facilitates removal of the inserts from the receptacle, especially when they are loaded with soil and flowers.

It is a further objective our invention to provide receptacle bodies of different shapes and sizes so as to accommodate a large number of different landscape architectural situations and settings. As hereinafter set forth, this is achieved by providing square, rectangular, semi-circular, and circular arrangements with corresponding shapes, cavities, and inserts so as to provide the appropriate aesthetics while still retaining the structural integrity and rigidity of the apparatus as described above.

BRIEF DESCRIPTION OF THE DRAWINGS

FIG. 9 is a plan view of a still further embodiment.

DETAILED DESCRIPTION OF THE ILLUSTRATIVE EMBODIMENTS

Figure 1:
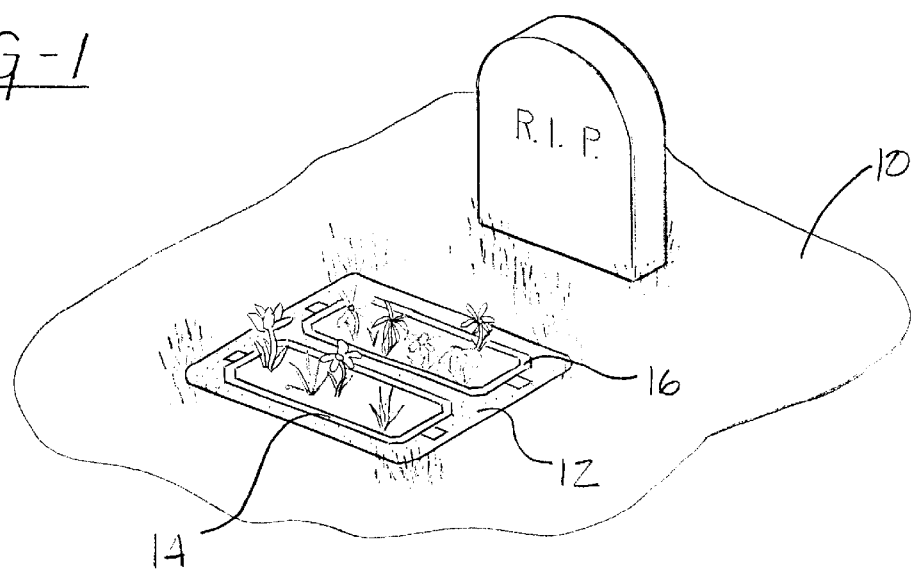
FIG. 1 is an environmental view of an embodiment of the invention to beautify a grave site.

FIG. 1 illustrates a defined ground area 10 in the nature of a burial site which has been aesthetically improved by the installation of an in-ground receptacle body 12 of molded plastic construction and a pair of insert bodies 14 and 16, all arranged essentially flush with the surface of the ground in area 10 to receive and display living, soil-planted flowers and flora. The plantings are well separated from the surrounding grass in the ground area 10 by the ground level peripheral flanges of the bodies 12, 14, and 16 so as to facilitate maintenance.

Figure 2:
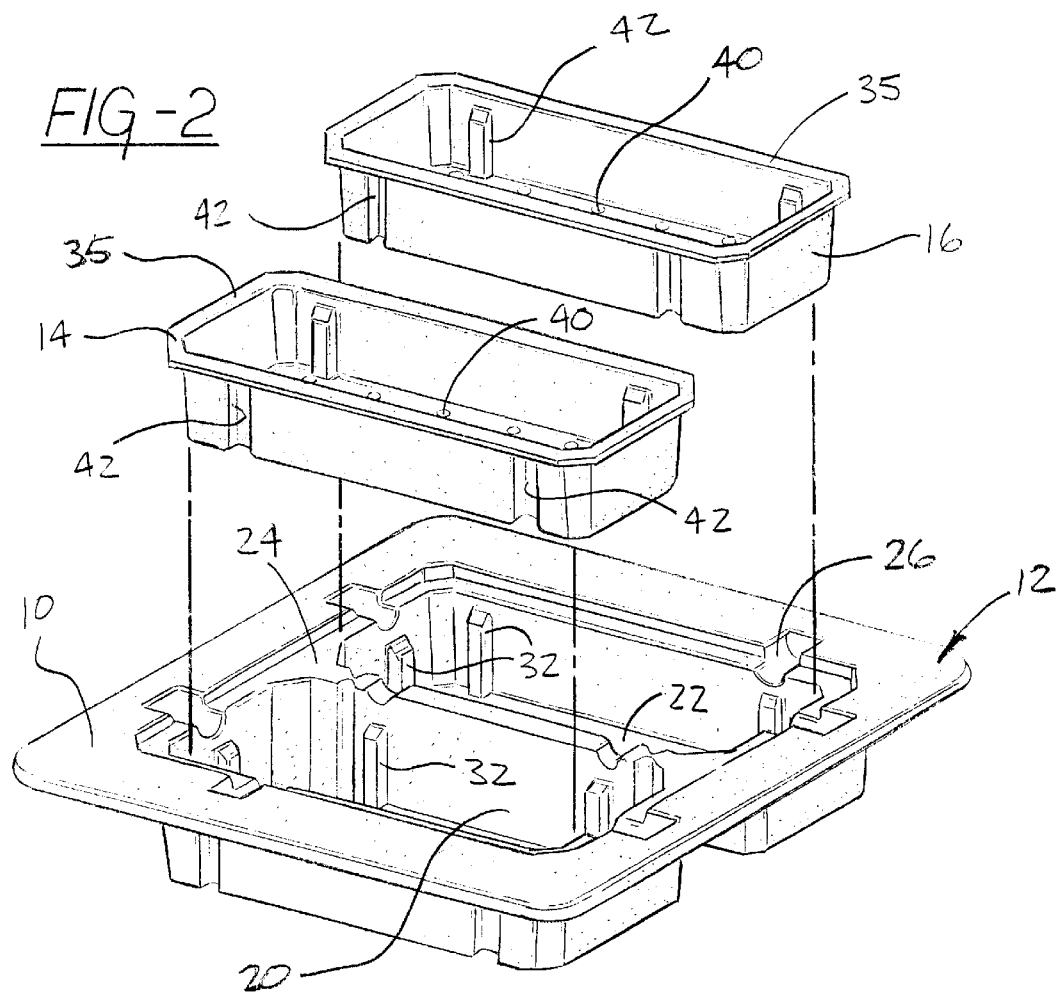
FIG. 2 is an exploded perspective view of the embodiment of the invention shown in FIG. 1.
Figure 3:
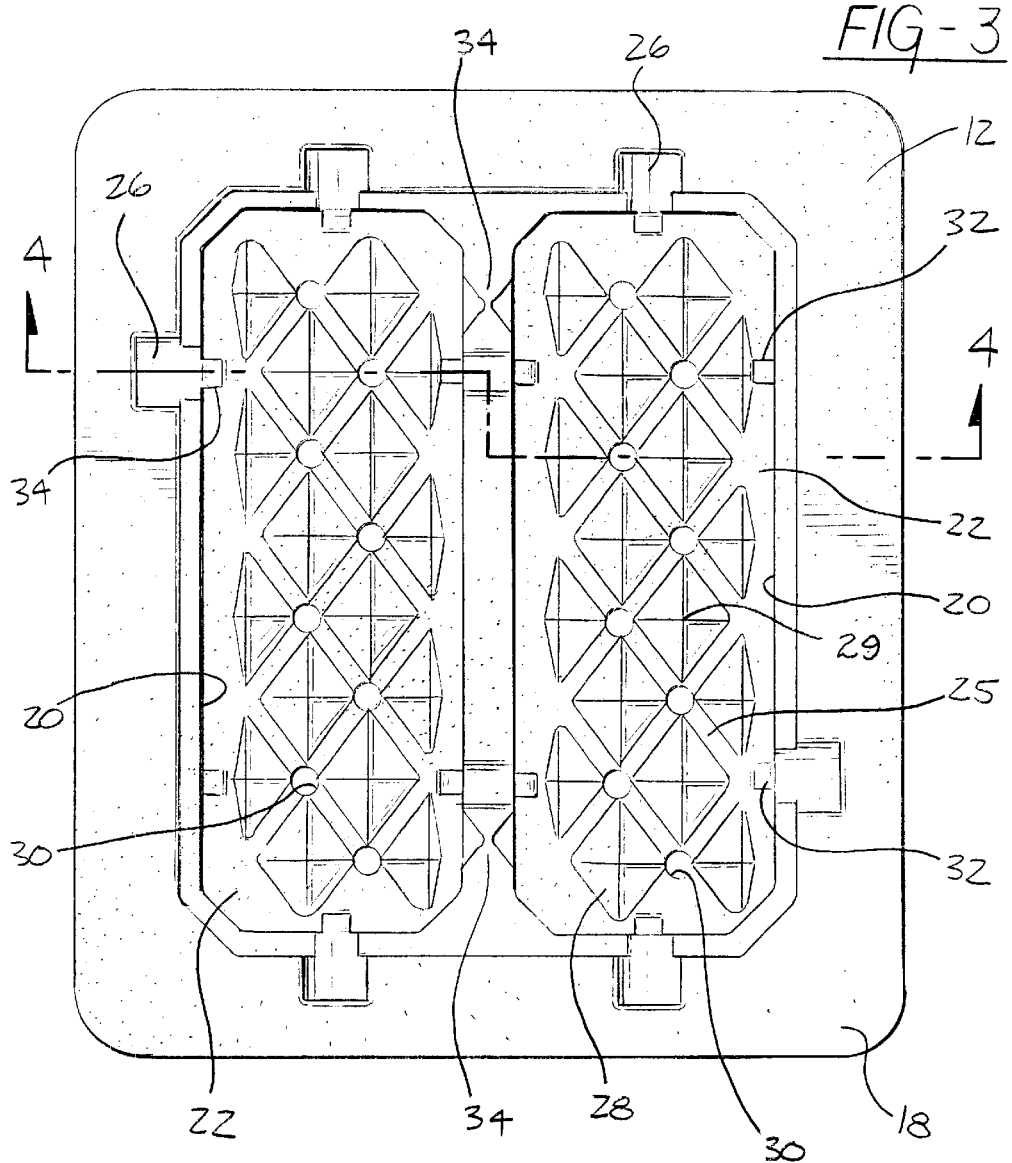
FIG. 3 is a plan view of the receptacle body of the embodiment of FIG. 2.
Figure 4:
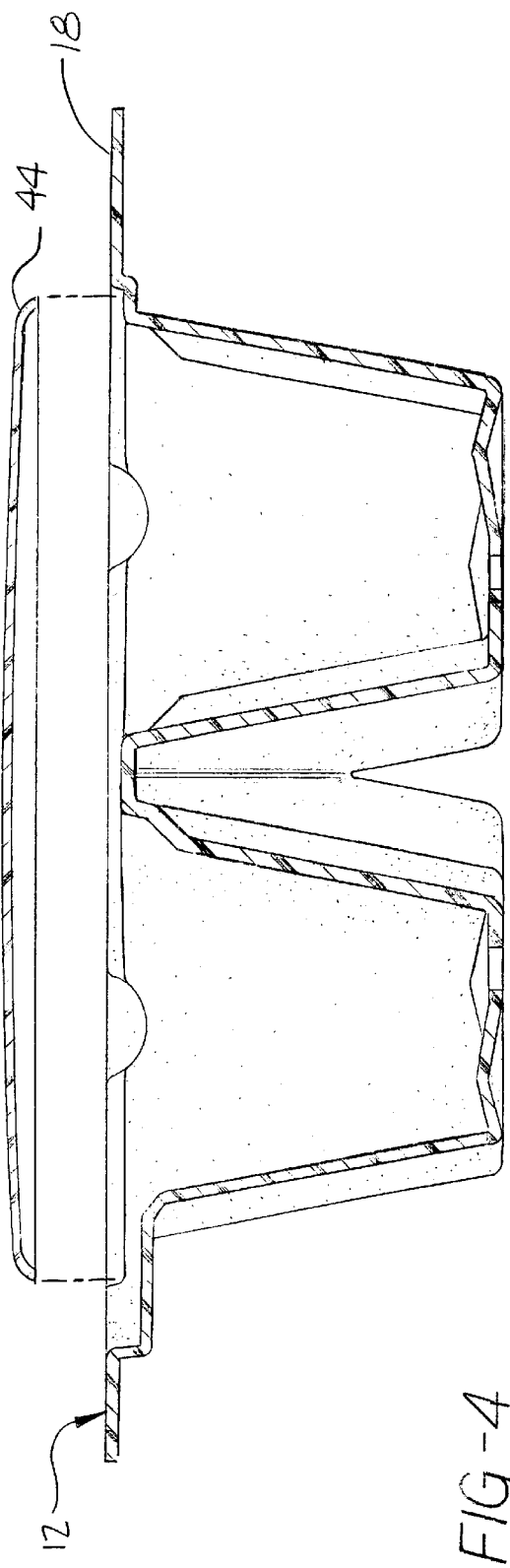
FIG. 4 is a side view in section of the receptacle body of the FIG. 2 embodiment.

Referring now to FIGS. 2 through 4, the bodies 12, 14, and 16 of FIG. 1 will be described in greater detail. As shown in the drawings, the receptacle body 12 is essentially rectangular in plan view, typical dimensions being on the order of 24"×26". The body 12 is made of non-corroding material such as high density polyethylene sheet and is preferably vacuum thermoformed into the desired shape. Body 12 can, however, be alternatively formed by injection molding. Body 12 exhibits a broad; i.e. approximately 3 ½" wide peripheral flange 18 which lies on and is flush with the ground when installed. Spaced within the peripheral flange 18 are two parallel rectangular cavities each having sidewalls 20 and floor 22. The cavities are open at the top and terminate in a surrounding land 24 which is recessed approximately ½" below the peripheral flange 18 for purposes to be described. Semi-cylindrical recesses 26 are formed at each of several locations around the periphery of the cavities to facilitate removal of inserts as hereinafter described.

Figure 8:
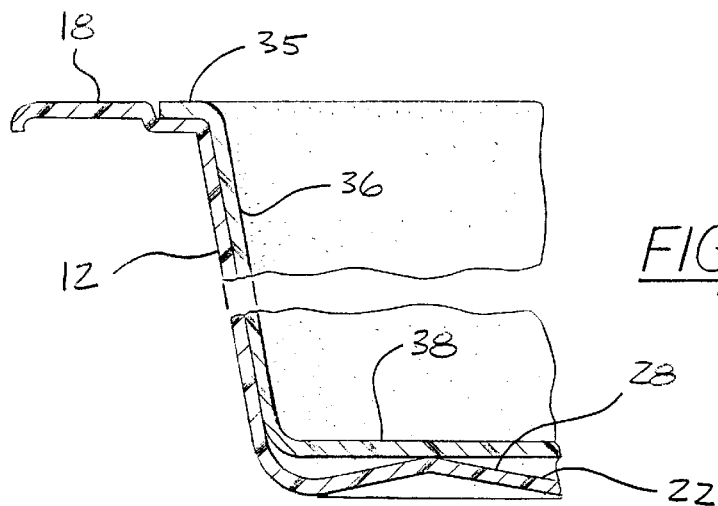
FIG. 8 is a side view in section of an insert in a receptacle body showing a detail of the receptacle body floor.

As best shown in FIGS. 3 and 8 the floors 22 of the cavities are formed to exhibit a uniform array of pyramidal structures 28 which provide a plurality of high points 29 between intervening and connecting channels 25 having intermittent drain holes 30.

Vertical square section reinforcing ribs 32 are formed in all of the sidewalls of the cavities and, as best shown in the plan view of FIG. 3, some of those reinforcing ribs are coincident with the semi-cylindrical recess 26.

Figure 7:
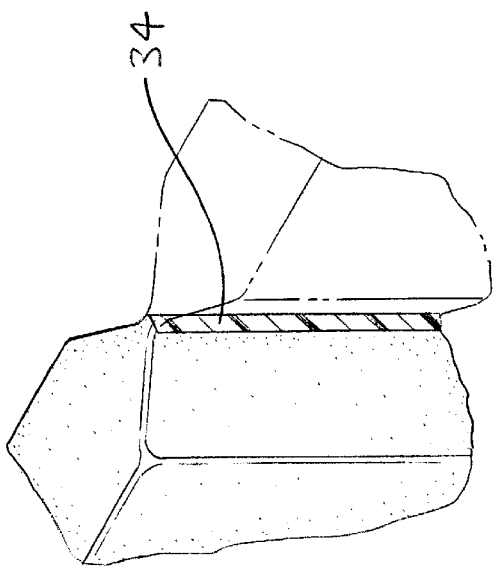
FIG. 7 is a perspective view partly in section of a fused area of the embodiment of FIGS. 1, 2, and 3.

As shown in the Figures, the two cavities have adjacent and parallel center sidewalls which are spaced apart by approximately 1 ¼" at the top and by a somewhat greater dimension at the bottom owing to the fact that the cavities taper inwardly from top to bottom. To rigidify the structure the center sidewalls are deformed toward one another in the thermoforming operation to provide fused areas 34 in the form of vertical knit lines as best shown in FIG. 7. Without the fused areas, the receptacle body 12 may flex about a vertical centerline of the FIG. 3 structure by application of a load to the top surface.

The apparatus of the invention as shown in FIG. 2, further comprises a pair of identical plastic insert bodies 14 and 16 each of which is provided with a top peripheral flange 35, sidewalls 36 and a flat floor 38 having drain holes 40. The insert body 14 and 16 are shaped and dimensioned to fit within the cavities of the receptacle body 12 such that the peripheral flanges 35 are seated in and on the land area 24 of the peripheral flange 18 and are essentially flush with or slightly below the top surface of the peripheral flange 18; in this position, the bottoms 38 of inserts 14 and 16 rest on the high points 29 of the receptacle floor. Recesses 26 are adjacent to but underline the insert flanges to provide for finger entry to aid in lifting the inserts from the receptacle 12. In addition, the inserts are provided with inwardly extending vertical recesses 42 which mate with the stiffening ribs 32 on the interior sidewalls 20 of the receptacle body cavities to prevent shifting and to aide in alignment. The inserts are also thermoformed from polyethylene sheet material which has been charged with a UV protectant. The inserts are about five inches deep, a depth which is chosen to provide sufficient said depth to encourage healthy plant growth.

In use, a simple template (not shown) may be used lay out a rectangular portion of the ground area 10 for a hole of the desired size and depth. Once the hole is dug and shaped, the receptacle body 12 is dropped into place. The body 12 is effectively suspended from the flange 18 and, when properly installed, the peripheral flange 18 is flush with the surface of the surrounding earth. The flange provides a natural mulch so as to eliminate the need for mowing close to the center areas of the cavities in which plants will be located.

Typically at a remote location, the inserts 14 and 16 charged with soil, fertilizer and plantings and are brought to the site of the installed receptacle 12. A lid 44 shown in FIG. 4 may be provided to temporarily cover both of the cavities of the receptacle 12 when they are not in use. The lid fits within the land 24 and is removed and stored in a convenient location whereafter the charged inserts 14 and 16 are dropped into place. These inserts may be replaced with freshly charged inserts from time to time or returned to a planting area and recharged with fresh plantings and thereafter returned to the receptacle 12. Recesses 26 aid in removing the inserts 14 and 16 from receptacle 12 by allowing the user to set his/her fingers under the insert flanges. A typical commercial business will have a number of the inserts 14 and 16 on hand and will recharge them from to time at a factory nursery and merely take them to the cemetery or other site to be decorated and exchange them for those previously charged inserts that are found at the site. The raised floor provides good drainage and prevents or eliminates any tendency of the inserts to freeze or stick to the floors of the receptacle.

Lid 44 is shown in FIG. 4 to have a slight convex shape; it is to be understood that it can also be flat or have greater height ad desired. In addition, it is possible and often desirable to make the load recess in the receptacle flange 18 shown in FIG. 8 twice as deep so that both the insert flange 35 and the lid can fit in it and remain essentially flush with the top surface of the flange 18.

The recesses 42 and the ribs 32 provide alignment for the insertion of inserts into the receptacle 12 and stabilize the structure when fully assembled. They may also be used to key particular inserts to particular receptacles.

Maintenance of large sites where the apparatus of FIGS. 1–4 is typically used are often maintained using power mowers. The Structural integrity of the receptacle 12, particularly with the fused areas 34 along the center line, is such that the receptacle 12 will tolerate the loads imposed by being overrun with the wheels of a typical lawn mower. The wide peripheral flange 18 provides a safety border which reduces the likelihood of damaging the plantings in the insert through inadvertent contact with mower blades.

Figure 5:
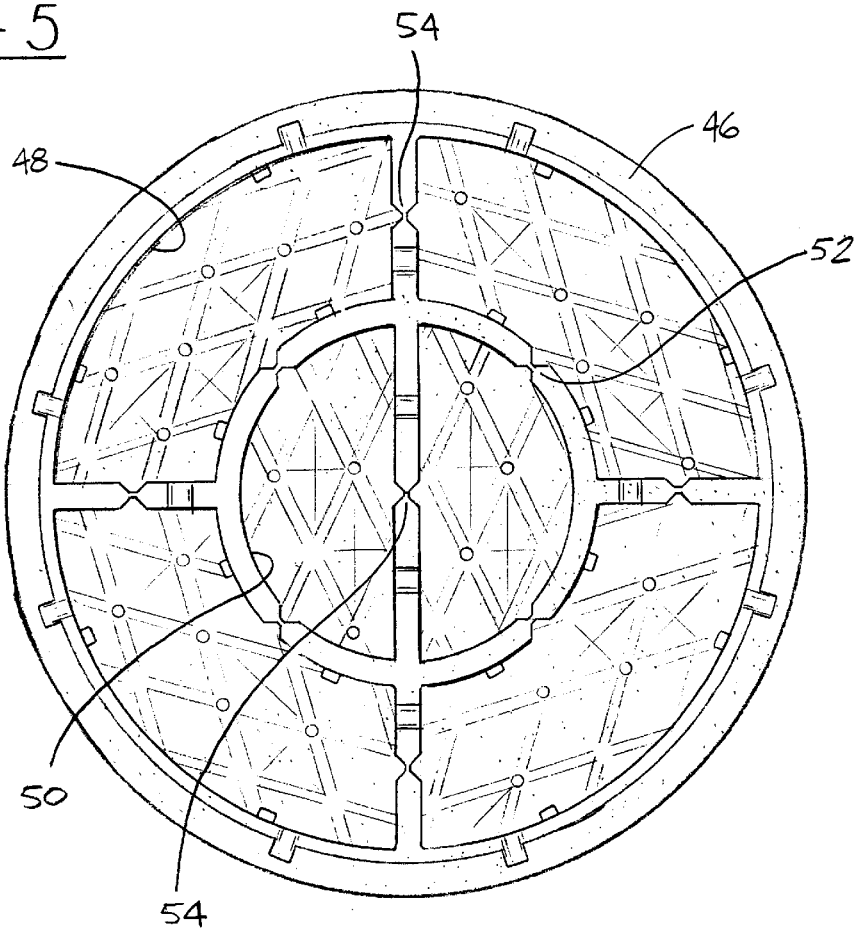
FIG. 5 is a plan view of a circular embodiment.
Figure 6:
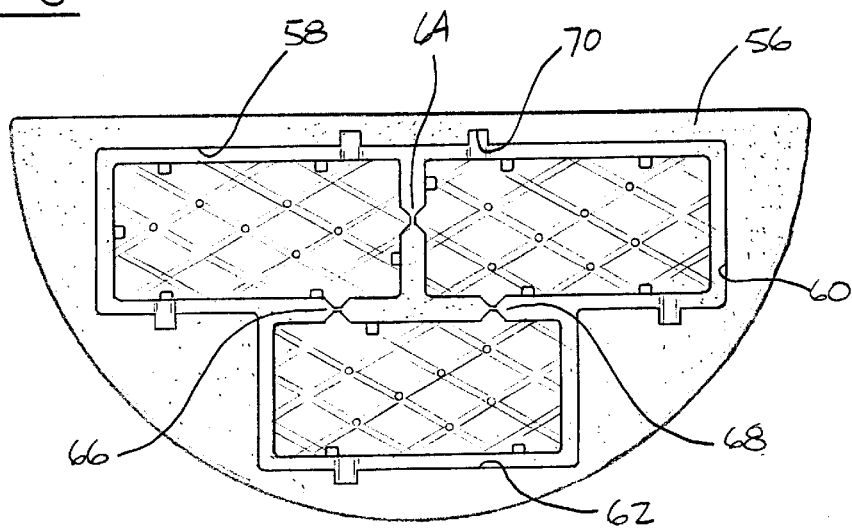
FIG. 6 is a plan view of a semi-circular embodiment.

Looking now to FIGS. 5 and 6, two additional shapes for a structure generally paralleling the structure shown in FIGS. 2–4 are shown. In FIG. 5 the receptacle body 46 is circular, has a broad peripheral flange and six internal cavities of which the outer four cavities 48 exhibit an included angle of 90 degrees and are arranged so as to provide a full circle. The two inner cavities 50 are semi-circular. All of the cavities have sidewalls which are adjacent to sidewalls of three other cavities. Similar to the arrangement of FIGS. 2 and 4, the adjacent side walls are deformed inwardly in the thermoforming operation to provide fused areas 52 and 54 which rigidify the structure and prevent hinging or bowing of the structure if loaded from above by, for example, being overrun with maintenance equipment. As is the case with respect to the embodiment of FIGS. 2–4, the floors are provided with the pyramidal pattern of raised and recessed areas and drain holes are provided. It is to be understood that the receptacle 46 of FIG. 5 is further provided with two types of correspondingly shaped and dimensioned inserts which are dropped into the cavities to complete the structure in the same manner as was described above with reference to FIGS. 2–4.

FIG. 6 illustrates a third embodiment wherein the receptacle 56 is semi-circular in plan view. Cavities 58, 60 and 62 are formed in the receptacle body 56, the arrangement being such that each of the cavities has an adjacent side wall with two other cavities. Again, fused areas 64,66 and 68 are provided to rigidify the structure and prevent flexing or bowing. Again, the overall details of the receptacle 56 are the same as those of the receptacle 12 of FIG. 2; i.e., it is provided with the recess in the peripheral flange, the access recesses 70, the pyramidal floor and the drain holes. It is to be understood that inserts of appropriate shape are also provided to match the cavities of the structure 56 of FIG. 6.

As indicated above, the preferred method of manufacturing the apparatus of the invention is thermoforming; i.e., a process in which flat sheets of appropriate heat-softenable plastic are placed in a two-part mold which is brought together to urge the material of the sheet plastic into the desired shape. Such sheets are preferably provided with an attractive surface grain, are dyed to a desirable color such as green and are loaded with UV protectant. The plastic sheets are thermoformed at an elevated temperature so as to make the material pliable and "sticky" when brought into contact with itself. Thermoforming is the preferred method of shaping polyethylene sheet and joining the adjacent side walls of the cavities to provide the fused areas 34 shown in FIG. 7. However, it is to be understood that while this is the preferred manufacturing method, the articles illustrated in the drawing can also be injection molded in which case joining of the side walls may not be necessary. If necessary or desired, the side walls can also be joined in secondary operations through additional structure such as metal or plastic straps.

Looking to FIG. 9, another embodiment is shown to comprise an elongated receptacle body 80 having a broad peripheral flange 82 and two longitudinally arranged rectangular cavities 84 and 86. The wall and floor structures of receptacle 80 are as described with respect to FIG. 2 and that description need not be repeated here. Recesses 88 provide lifting access to inserts which may be identical with those shown at 14 and 16 in FIG. 2. Receptacle 80 does not exhibit the fused areas 34 of FIG. 7; rather, it is molded or otherwise formed to exhibit a prelocated fracture line 90 by way of which the long receptacle may be divided into two smaller receptacles as desired. If it is used as is, a strap or other reinforcement may be used to tie the cavity side walls to one another as necessary.

What is claimed:

1. An apparatus for providing renewable in-ground plantings in a defined ground area comprising:

a rigid receptacle body having an essentially flat peripheral top flange and at least two cavities formed within the area defined by the top flange, each said cavity having sidewalls, at least one of said sidewalls being closely adjacent but spaced from a sidewall of another cavity, said adjacent sidewalls having an essentially vertical fused seam formed therebetween and extending from said top flange substantially the entire height of the sidewall in which said fused seam is formed; and at least two insert bodies each having open opposed sidewalls shaped and dimensioned to fit into and within the sidewalls of a respective cavity in essentially conforming relation thereto; each of said insert bodies having a peripheral flat flange which overlies the flat peripheral top flange of the receptacle body for support thereon, whereby the insert bodies may be charged with soil and plantings and used to replace previously installed insert bodies;

said receptacle and insert bodies being relatively dimensioned such that with said inserts fitted into the respective cavities, a large flat peripheral border area of the receptacle top flange is exposed to allow maintenance equipment to transverse the exposed large flat peripheral border area of the receptacle top flange without endangering the plantings rooted in the soil.

2. The apparatus as defined in claim 1, further including a recessed land area formed in the receptacle peripheral top flange to receive the insert flanges, said exposed large flat border area of the receptacle top flange being defined in outwardly surrounding relation to the recessed land area.

3. The apparatus as defined in claim 1, wherein the insert and receptacle bodies are made of thermoformed plastic.

* * * * *